United States Patent

[11] 3,599,502

[72] Inventors John T. Craft
 Sturgis, S. Dak.;
 John D. Forbes, Overland Park, Kans.;
 Merle E. Vig, Mud Butte, S. Dak.
[21] Appl. No. 7,588
[22] Filed Feb. 2, 1970
[45] Patented Aug. 17, 1971
[73] Assignee Jolyn Corporation
 Sturgis, S. Dak.

[54] FRICTION CHAIN DRIVE
 5 Claims, 3 Drawing Figs.
[52] U.S. Cl. .................................................. 74/219,
 74/203, 74/242.15 R
[51] Int. Cl. .................................................. F16h 7/00,
 F16h 15/00, F16h 7/10
[50] Field of Search .......................................... 74/219,
 221, 229, 242.15 B, 203, 207

[56] References Cited
 UNITED STATES PATENTS
 3,400,540 9/1968 Cresswell et al. ............... 74/221 X 3,406,582 10/1968 Frentzel ...................... 74/242.14

Primary Examiner—Leonard H. Gerin
Attorney—Mauro and Lewis

ABSTRACT: The device consists of an endless link chain drive rotatable by a conventional sprocket driven by a suitable motor. The chain element is intended to encircle and to drive a rotary object such as a wheel or drum (e.g. the drum of a concrete mixer). A circumferential band or belt of resilient material is applied to the periphery of the wheel or drum with which the chain makes frictional contact. The resilient belt is applied by a suitable material of adhesive nature to the wheel or drum to be driven. A tensioning device such as a tension bolt to adjust the spacing between the sprocket and drum, allows adjustment of the amount of frictional contact of the chain with respect to the belt. Spaced metallic feet carried by the chain may be employed to make contact with the belt.

The above arrangement allows for a desirable and adjustable amount of slippage between the driving and driven elements to prevent damage to the elements and their connections.

PATENTED AUG 17 1971 3,599,502

INVENTORS
JOHN T. CRAFT
JOHN D. FORBES
MERLE E. VIG

BY *Mauro & Lewis*
ATTORNEYS

FRICTION CHAIN DRIVE

BACKGROUND OF THE INVENTION

The device is broadly a transmission mechanism for driving a rotary device from a powered rotary source, wherein provision is made to protect the device from damage due to variations in the rotational speed of the transmission.

BRIEF SUMMARY OF THE INVENTION

Very few transmissions of the type broadly described above are driven at a constant rate, either due to the requirements, or for accidental reasons. When a given driven gear, sprocket, belted wheel or the like, is suddenly slowed, stopped, or even reversed, damage can obviously occur, and many various means have been devised to avoid such damage.

Frictional transmissions are known, usually consisting of a powered resilient wheel making frictional contact with a similar driven wheel. Such transmissions have low load capacity, and suffer wear when slippage occurs. An example of this type of transmission can be seen in the patent to Merle E. Vig, U.S. Pat. No. 3,369,799, granted Feb. 20, 1969 for a "Tractor Mounted Concrete Mixer," wherein a motor 31 drives a friction wheel 32 pressed into contact with a friction belt 30 applied to the periphery of a concrete mixer drum for rotating the latter. The present invention has highly practical advantages for use in this particular machine, hence the appended drawings will slow similarities to the patent drawings, for simplicity of the illustration. The various uses of the present invention are not, of course, limited to this type of concrete mixer or to concrete mixers in general.

The present invention has among its advantages the elimination of a mechanical driven gear, sprocket, or the like. Instead is provided on the driven element a nonmetallic resilient band of durable material (such as cord reenforced rubber) over which a link-type chain driven by a sprocket engages the resilient band which is affixed to the wheel, drum, barrel or the like—the element to be driven.

When the driven element (further referred to as a drum) is (a) imperfectly shafted, or (b) is out of round at the connection point with the chain, or (c) subjected to abrupt changes in driven speed, or (d) subjected to hard usage under use over hard terrain or exposure to dirt or weather, breakdowns and damage can obviously occur.

According to the present invention, a power-operated sprocket mounts a link-type driving chain which is spacedly entrained over a rotatable drum, with the interposition of a broad belt or band of resilient material bonded to the drum by a suitable adhesive so as to underlie the chain. The sprocket, and hence the chain, are rendered adjustable with respect to the drum so as to control the tension of the chain upon the belt, to conform to load factors.

The flexible link driving chain may be equipped with spaced feet to increase engagement with the flexible or resilient belt and these feet may be further equipped with pins or rivets for partial penetration into the belt. Under heavy load conditions other rivets or like connectors are employed to supplement the adhesion of the belt to the drum.

The above elements may obviously be duplicated to suit various transmissions or load factors.

DETAILED DESCRIPTION OF THE DRAWINGS

Figure 1:
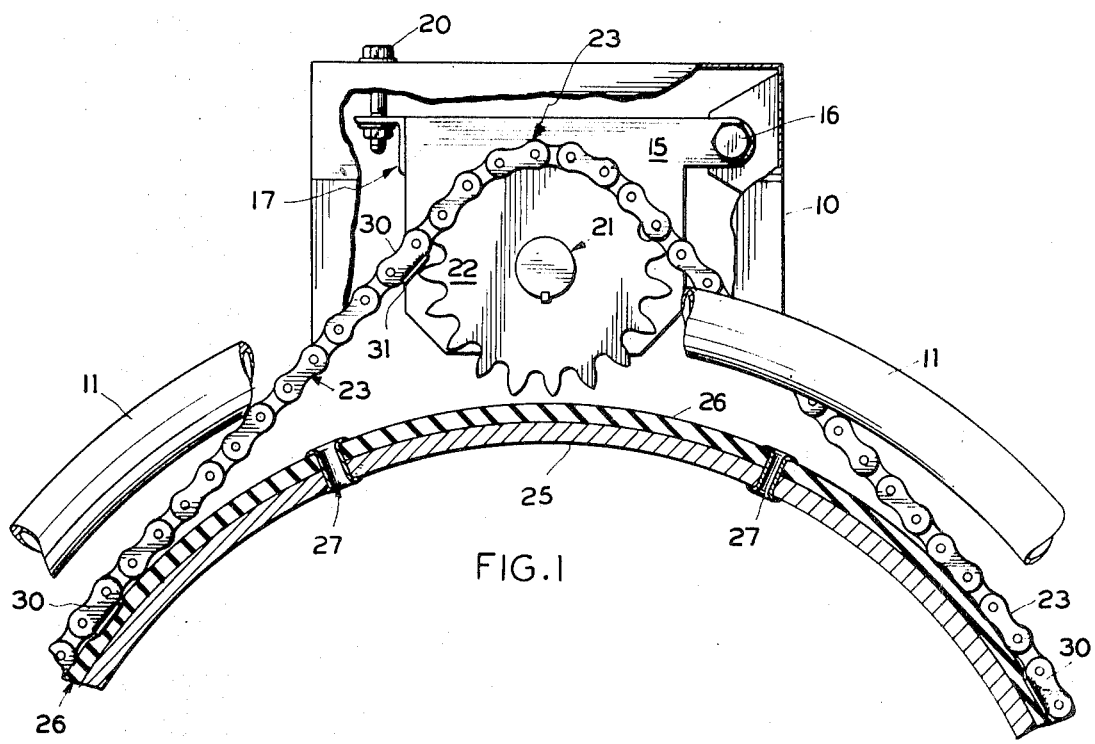
FIG. 1 is an elevation drafted transversely across a transmission according to this invention, with parts broken away and some parts shown in section.
Figure 2:
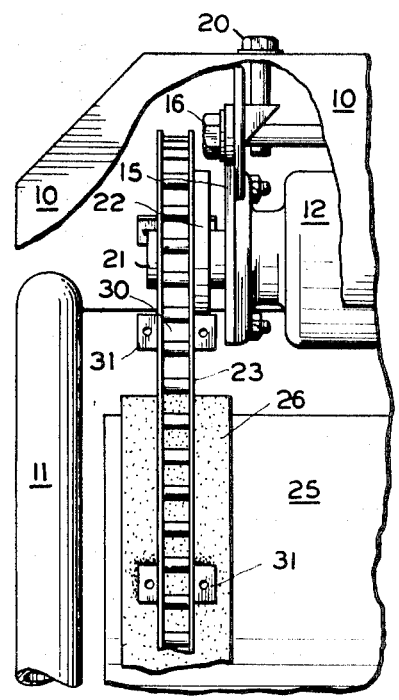
FIG. 2 is a side elevation taken at a right angle to the view of FIG. 1, with parts broken away.

A housing 10 attached to a machine such as a concrete mixer is supported as by tubular supports 11, these being shown broken away. Housing 10 contains a motor 12, preferably a fluid-type motor remotely controlled and powered. Motor 12 is carried by a bracket 15 pivoted to housing 10 as by a bolt 16. The opposite side of the bracket 15 carries an extension 17 bored to receive the end of a tension bolt 20 whose upper end passes externally of housing 10 through a suitable bore.

Shaft 21 of motor 12 carries a sprocket 22 over which is trained an endless link chain 23. Numeral 25 represents a portion of the element to be driven, like part of the drum of a concrete mixer. The means for rotationally supporting drum 25 is not shown but may be the same as shown in the above-mentioned U.S. Pat. No. 3,369,799.

Secured around the outer periphery of drum 25 is a heavy duty belt of resiliently formed material 26 such as reinforced rubber or rubber substitute. Belt 26 is centered around drum 25 in such position that that it will underlie and rotate on the same axis as chain 23. Belt 26 is secured to drum 25 by a suitable adhesive. Additionally reinforcing connectors such as rivets 27 may be used to assist the adherence of belt 26 to drum 25, and are specially employed where belt 26 is not of the endless variety. In this case rivets 27 are used adjacent the location where the ends of belt 26 abut.

Figure 3:
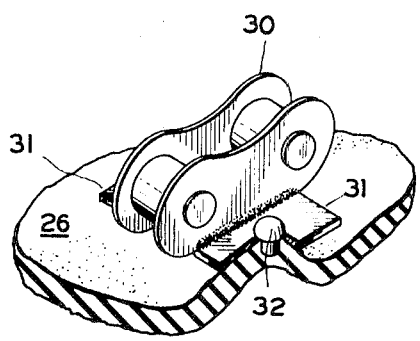
FIG. 3 is an enlarged detail in perspective, showing the application of a single chain link bearing one of the feet which engage the resilient belt shown in FIGS. 1 and 2.

The ability of chain 23 to make frictional contact with belt 26 is enhanced by including in chain 23 spaced links 30 of the type shown in FIG. 3. The sidewalls of links 30 are formed with angled extensions or feet 31 to further assist traction of chain 23 upon belt 26. Feet 31 carry pins such as rivets 32 which partially penetrate belt 26, when extra traction is needed.

MODE OF OPERATION

By the adjustment applied to tension bolt 20, the spacing between sprocket 22 and drum 25 can be varied which results in a selective degree of tension applied to chain 23 and hence exerted upon the resilient belt 26. More such tension is obviously needed where the drum 25 carries a heavy load to be rotated.

When the transmission is in normal operation, the tension applied to chain 23 is not too great to prevent a certain amount of flexibility between driving and driven elements. The resilient belt 26, however, greatly enhances this flexibility, with the result that sudden changes in the driving speed, stopping suddenly, reversal, or the like are absorbed by the flexibility of the parts described which eliminates or substantially reduces damage.

What we claim is:

1. A transmission including a housing containing a motor, a sprocket shafted to said motor, a rotationally mounted driven member spaced apart from said sprocket, a chain drive trained over said sprocket and around said driven member, said driven member having circumferential resilient means bonded externally thereto in operational contact with said chain drive, and means adjusting the tension of the chain drive for varying the amount of frictional contact applied by said chain drive to said resilient means.

2. The transmission according to claim 1, wherein the means for adjusting the tension of the chain drive comprise means for varying the spacing between the sprocket and the driven member.

3. The transmission according to claim 2, wherein the means for adjusting the tension of the chain drive includes a pivoted mounting between said motor and its housing, and means on said housing for shifting said motor toward or away from said driven member.

4. The transmission according to claim 1, wherein selected links of said chain drive are equipped with extensions flatly engaging said resilient means to increase increase traction therewith.

5. The transmission according to claim 1, where selected links of said chain drive are equipped with pins positioned to penetrate said resilient means.